Oct. 23, 1951 LE ROY F. CARKHUFF 2,572,800
CARTON SETUP MACHINE
Filed Nov. 23, 1946 9 Sheets-Sheet 1

INVENTOR.
LeRoy F. Carkhuff
BY
Cromwell, Greist and Warden
Att'ys.

Oct. 23, 1951     LE ROY F. CARKHUFF     2,572,800
CARTON SETUP MACHINE

Filed Nov. 23, 1946                          9 Sheets-Sheet 4

INVENTOR.
Le Roy F. Carkhuff
BY
Cromwell, Greist and Warden
Attorneys.

Oct. 23, 1951     LE ROY F. CARKHUFF     2,572,800

CARTON SETUP MACHINE

Filed Nov. 23, 1946     9 Sheets-Sheet 5

INVENTOR.
Le Roy F. Carkhuff
BY
Cromwell, Greist and Warden
Attys

INVENTOR.
LeRoy F. Carkhuff

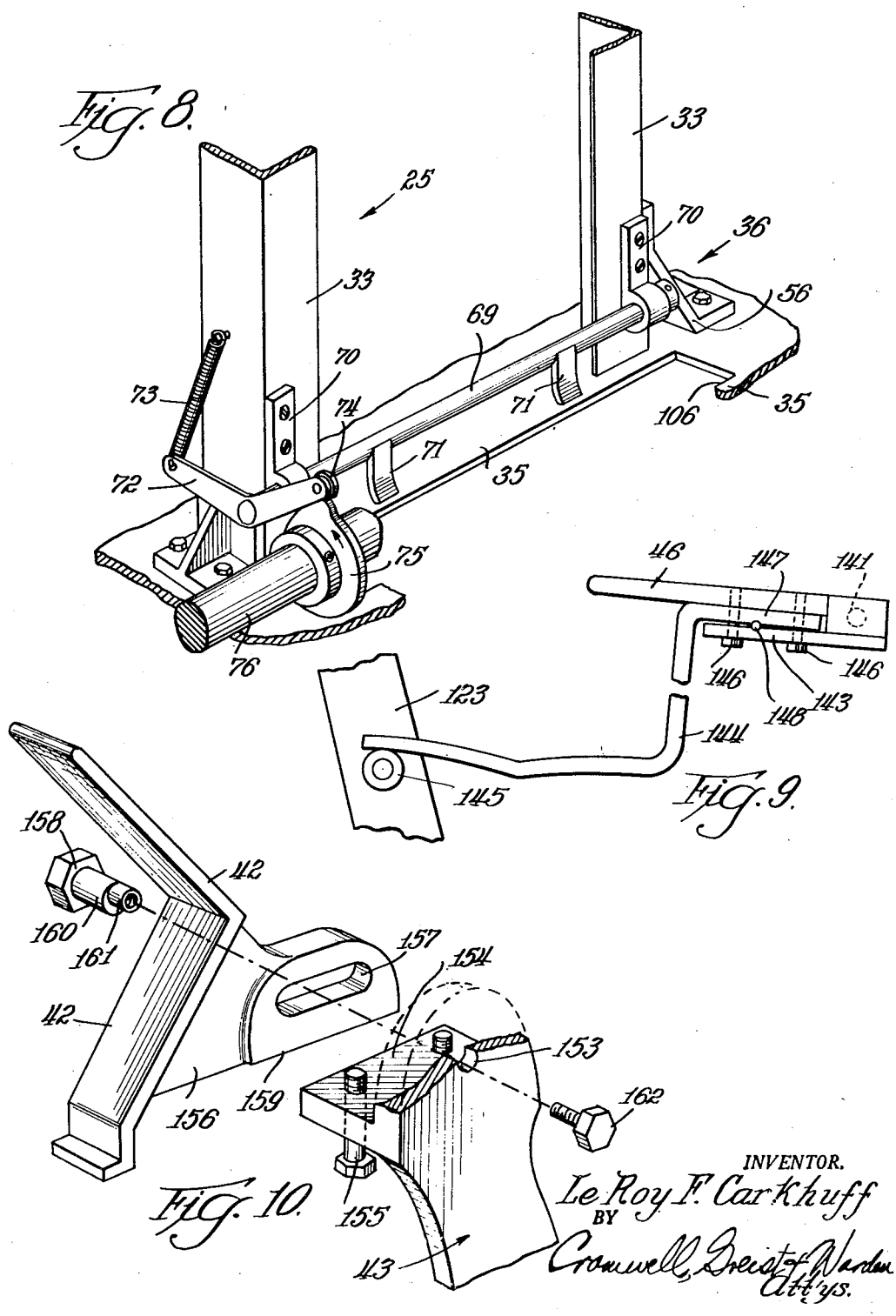

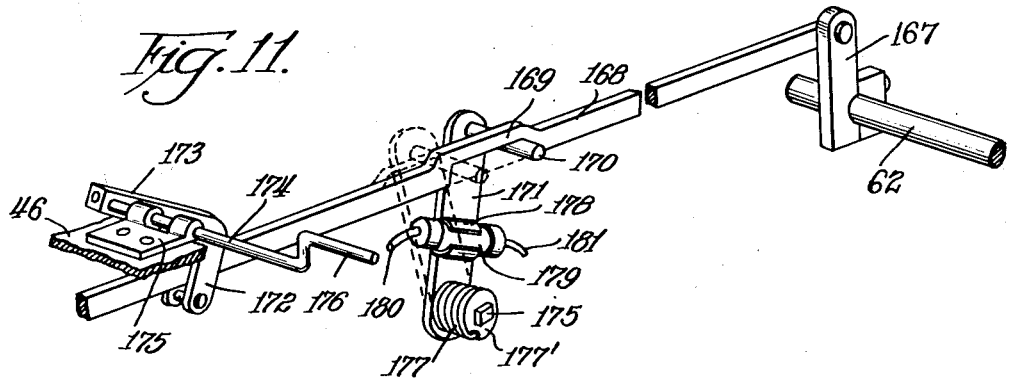
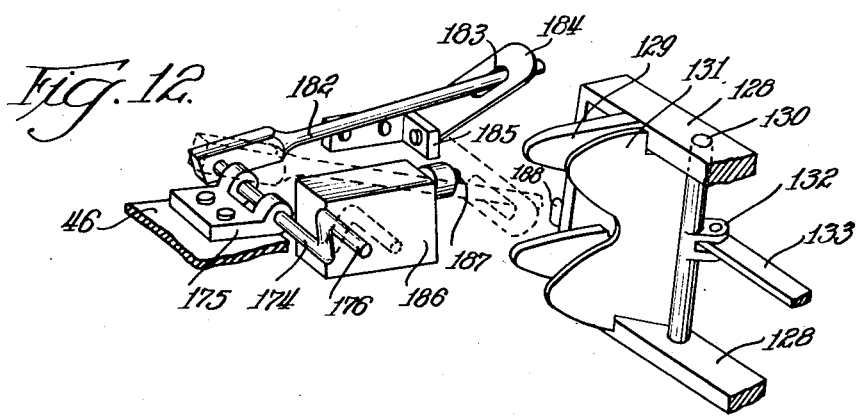
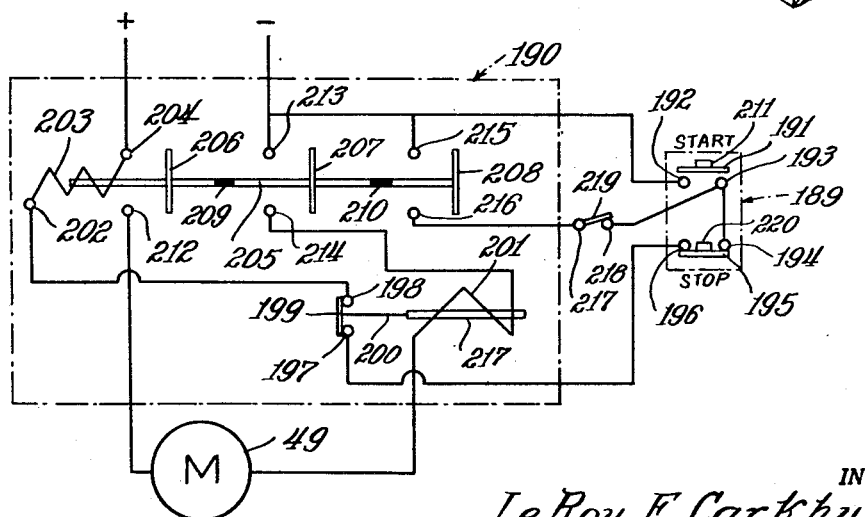

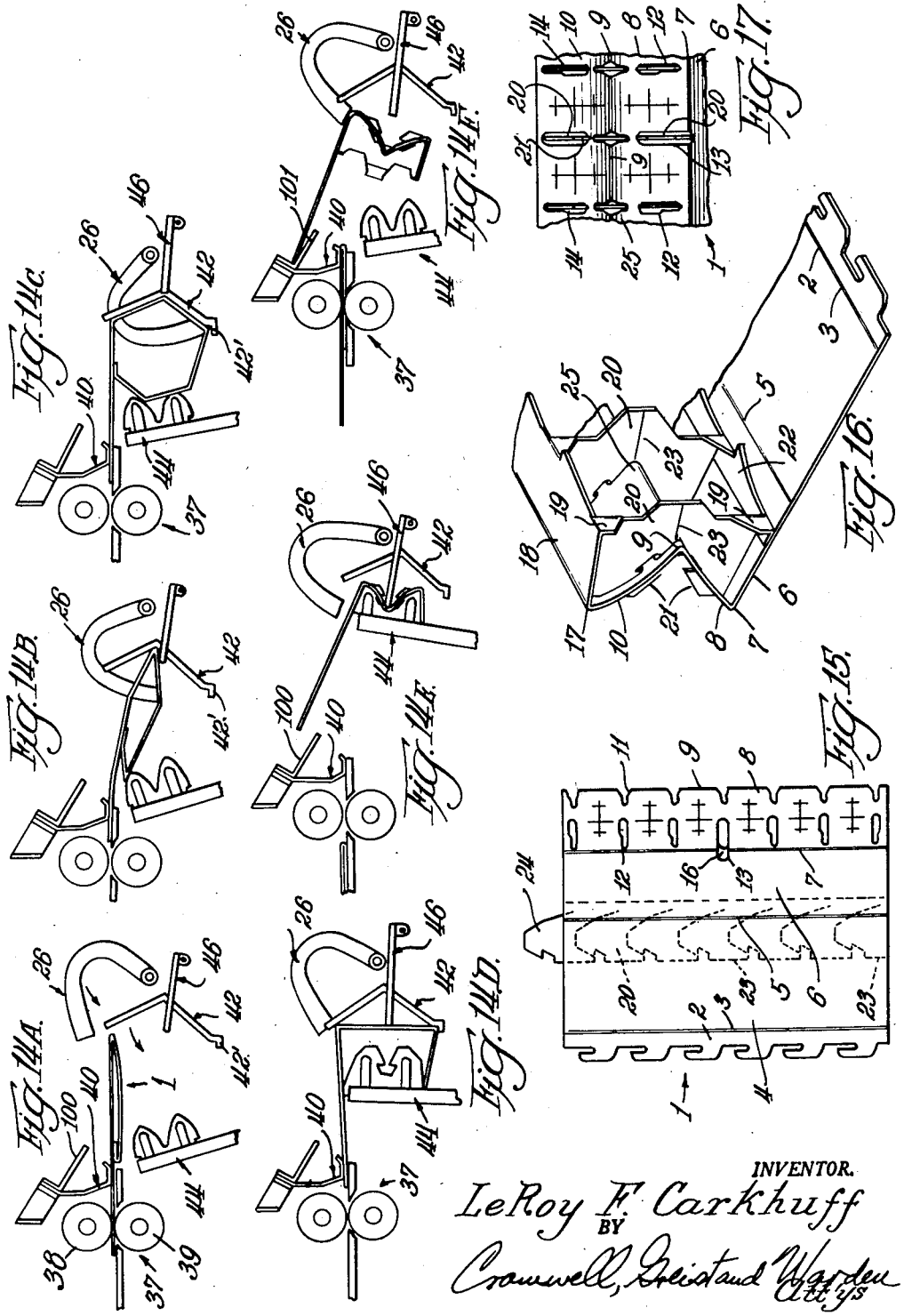

Patented Oct. 23, 1951

2,572,800

UNITED STATES PATENT OFFICE 2,572,800

CARTON SETUP MACHINE

Le Roy F. Carkhuff, Morris, Ill., assignor to Shellmar Products Corporation, Chicago, Ill., a corporation of Delaware Application November 23, 1946, Serial No. 711,855

5 Claims. (Cl. 93—37)

This invention pertains to machines for setting up egg cartons and has particular reference to machines for the setting up of cartons of the type disclosed in U. S. reissue patent to Troyk No. 18,922, dated August 22, 1933. The invention is an improvement over the machine disclosed in U. S. patent to Burger No. 2,018,396, dated October 22, 1935.

It is an object of the invention to provide an improved carton set-up apparatus of the above type, characterized by the provision of a magazine or hopper adapted to receive and register a stack of cartons in the relatively flat knockdown condition thereof, in which said cartons present sections of varying vertical thickness, together with a simple and improved type of reciprocating device for forwarding the lowermost carton of the stack towards certain carton set-up instrumentalities.

Another object is to provide an apparatus having carton receiving and forwarding means of the above type, including means whereby the forwarding of more than a single carton at a time is positively prevented, the carton forwarding device being moreover of a character to unfailingly forward the lowermost carton on an operating stroke and to perform its return stroke without interfering engagement with the next adjacent carton in the stack.

Another object is to provide an apparatus of the type described, including carton feeding means and variably positionable carton registering apparatus, adapted to function as cartons of variable thickness, are fed forward to gauge the cartons and afford sufficient clearance for passage therebeneath of the sections of differing thickness of the advancing carton.

A further object is to provide a set-up apparatus of the type described, including means for forwarding cartons individually to certain set-up instrumentalities, along with spring gripping means effective to retain a portion of a carton while being manipulated by said instrumentalities, after said carton has passed out of control of the forwarding means therefor.

Yet a further object is to provide apparatus of the type described having, in association with the carton feeding instrumentalities referred to above, an improved printing device for applying certain indicia or legends to a portion of the advancing carton, said device having novel means for supporting the traveling carton during printing in a manner to minimize destructive or abrasive action on the printing element thereof.

A still further object is to provide a carton set-up apparatus of the foregoing character, including improved means for distending and erecting the cell-carrying body of the carton in a positive and unfailing manner, together with provisions for employing the distending means referred to in discharging a completed set-up carton from the machine.

A still further and more specific object is to provide a carton set-up apparatus having means for distending a carton body preliminary to the erection of certain cell-defining cross partitions and a longitudinal medial partition internally of said body, said distending means taking the form of an oscillatable member and a cam for actuating the same, which cam is so conformed as to control said oscillating member in a subsequent carton-discharging function.

Another object is to provide an apparatus of the type described, including a traveling partition set-up head on which the body of the carton is supported for movement, together with automatic throw-out or machine stop means responsive to the presence or absence of a properly set-up carton on said head, respectively to permit further normal operation of the apparatus or to halt the apparatus by interrupting its electrical energizing circuit.

The foregoing statements are indicative in a general way of the nature of the invention, but other and more specific objects will be apparent to those skilled in the art upon a full understanding of the construction and operation of the device.

A single embodiment of the carton set-up apparatus as a whole is illustrated herein for the purpose of exemplification, together with two alternatively available forms of automatic throw-out mechanism associated therewith for the purpose noted above. However, it will be appreciated that the invention is susceptible of incorporation in other modified forms coming equally within the scope of the appended claims.

In the drawings,

Fig. 8 is a fragmentary perspective view of the forward end of the hopper, as it appears with certain parts removed to better illustrate an improved carton gauging and registering mechanism associated with the hopper;

Fig. 9 is a diagrammatic showing of the longitudinal partition erecting or set-up blade and the means imparting its requisite movement;

Fig. 10 is an exploded fragmentary perspective view of one of the carton body erecting members and the parts which enable adjustment of its position;

Fig. 11 is a perspective view of one form of automatic shut-off suitable for the machine;

Fig. 12 is a perspective view of a modified form of automatic machine shut-off;

Fig. 13 is a wiring diagram showing the electrical circuits involved in the operation of the machine;

Figure 1:
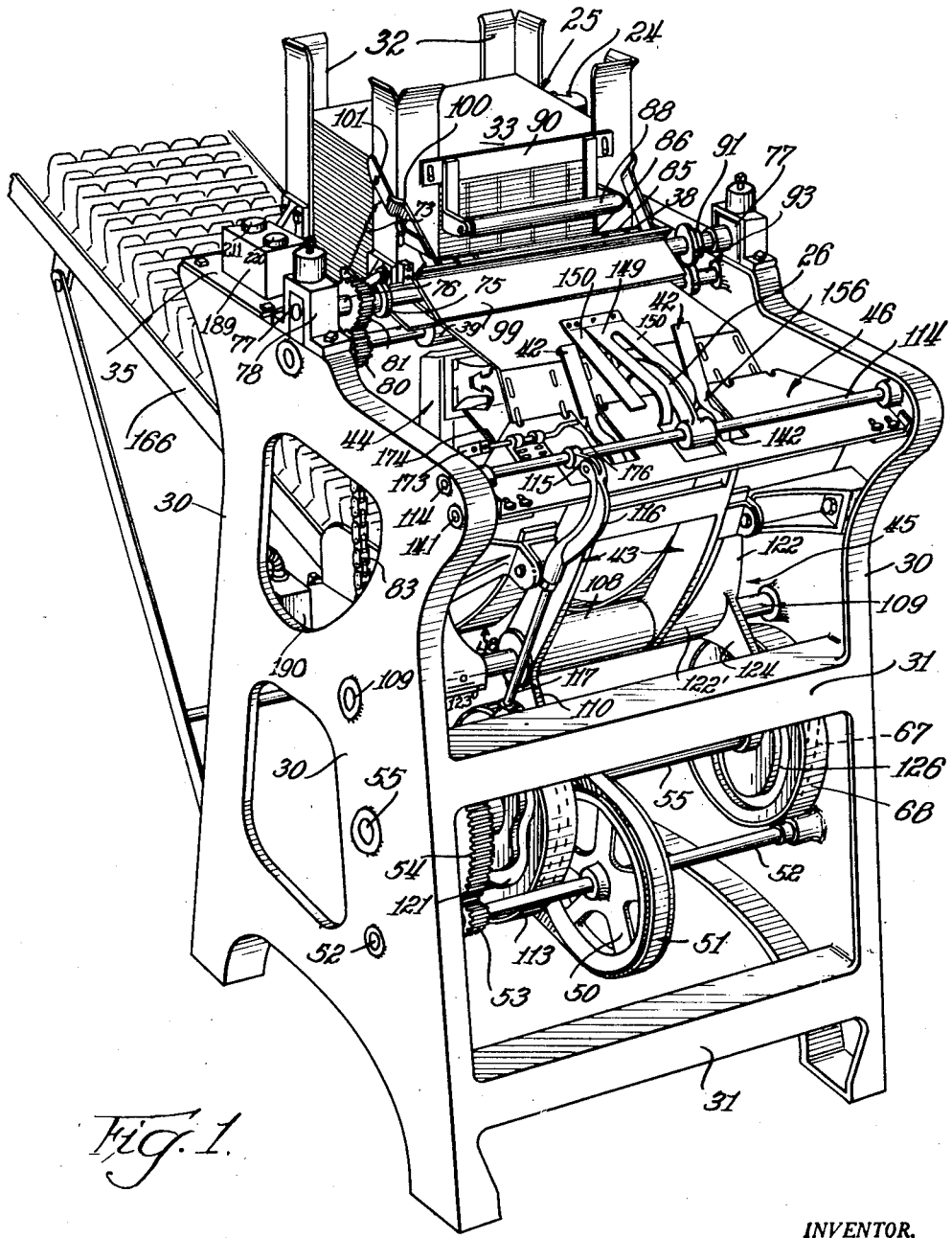
Fig. 1 is a perspective view of a complete carton set-up machine according to the invention.

Figs. 14-A to 14-F inclusive are a series of schematic drawings illustrating typical positions of certain of the machine parts as they operate to set up a carton;

Fig. 15 is a plan view of a typical Troyk egg carton, shown in the knock-down position in which such cartons are placed in the machine hopper;

Fig. 16 is a fragmentary perspective view of the carton in erected or set-up condition; and Fig. 17 is a fragmentary bottom view of the carton, illustrating certain particular features thereof which are pertinent to the functioning of the machine.

The Troyk type carton which is designated by the reference numeral 1 and particularly illustrated in Figs. 15 through 17, and which the present apparatus is intended to manipulate, is formed from a unitary paper board blank, cut, creased or scored, folded and glued as hereinafter described. It is shipped to users in bundles of 250 cartons, each carton being in the knocked-down form shown in Fig. 15.

The carton comprises a locking strip 2 having lock hooks formed along its free edge, the strip being bendable along a score line 3 with respect to a carton cover 4. Cover 4 is bendable along a fold line 5 with respect to a rear wide wall 6, and the latter is bendable along a fold line 7 with respect to a bottom panel 8. Bottom panel 8 is bendable with respect to a substantially duplicate bottom panel 10 along a medial crease or score line 9. A row of inwardly directed openings 11 is formed at the juncture of bottom panels 8, 10 to receive the transverse carton cell-defining partitions in the set-up condition of the carton. Another row of spaced openings, each indicated by reference numeral 12, is formed in bottom panel 8, each adapted to receive a hooked end of a transverse partition of the erected carton. Bottom panel 8 is also provided with a relatively large central opening 13 in alignment with the row of spaced openings 12, said opening 13 traversing fold line 7 a substantial distance into rear wall 6, as best seen in Figs. 15 and 17.

Bottom panel 10 is provided with a row of openings 14 (Fig. 17) identical in shape and function to openings 12 in bottom panel 8, one of which is in alignment with central opening 13 in bottom panel 8 but somewhat shorter than opening 13. As a result, in the knocked-down condition of the carton (Fig. 15) there is a small area 16 internally of bottom panel 10 which is upwardly accessible through opening 13 for engagement by the hereinafter described carton body spreading member during the operation of the machine.

Bottom panel 10 is foldable with respect to a carton front side wall 18 along a fold line 17 and a plurality of individual transverse partitions, each indicated by numeral 20, are cut out as a unit from a panel extending between front wall 18 and a terminal glue strip 22, which latter is attached by adhesive or other suitable fastening means to the inner surface of rear wall 6 to lie in face contacting engagement therewith. In the knocked-down condition of the cartons transverse partitions 20 are folded along medial score lines 23 to lie coplanar with and against one another, to form a double ply of material. In the set-up condition of the carton, with the carton walls 6, 18 spread apart, the transverse partitions 20 spread out along fold line 23 into flat, horizontal extended position between walls 6, 18 and are thereafter swingable from flat, coplanar relation to spaced upstanding relation between and normal to the walls 6, 18. The last named swinging occurs on opposed hinges 19. Each transverse partition is provided at its outer end with opposed identical hooks 21 which face each other, being medially notched in inverted V outline, as shown in Fig. 16.

In the erected condition of the carton, bottom panels 8, 10 are folded on fold line 9 into inverted V formation to extend between the hooks 21, 21 (Fig. 16) of the spaced transverse partitions, forming a two-walled longitudinal partition 25 which divides the carton into two rows of cells. The upper medial portion of the opening between the hooks 21 of each transverse partition extends through the opening 11 adjacent the juncture of panels 8 and 10, and the opposed hooks 21 extend through openings 12, 13 in bottom panel 8 and through openings 14 in bottom panel 10, being firmly engaged therein and locked positively against withdrawal.

The function of the machine of the present invention is that of erecting the cartons shown in Figs. 15 through 17 from the fully flattened out knock-down condition which they have when shipped to users, as shown in Fig. 15, to fully erected, article-receiving form shown in Fig. 16.

Prior to a detailed description of the various operating instrumentalities of the machine, it is believed that a general description of the basic parts thereof and their correlative functioning will facilitate an understanding of the specified features of improvement herein dealt with. The operating parts are mounted on a supporting base comprising spaced frame members 30 rigidly connected in parallel relation by the cross braces 31, said frame members furnishing journaling and supporting means for various shafts, brackets, etc., to be hereinafter described in detail.

A stack of knocked-down cartons of the type described above is maintained in a magazine or hopper, generally designated 25, which is composed of pairs of rear and front, angle iron, corner uprights 32 and 33 respectively, and the lowermost carton of the stack is periodically forwarded from the hopper for the setting up operation by a pair of simultaneously movable pusher lugs 34 acting in parallel paths over parallel elongated openings in the floor 35 of the hopper. The hopper floor extends between and is supported by frame members 30 and the uprights 32, 33 are supported on this floor by suitable brackets.

Upon issuance from the hopper 25, the lowermost carton is gauged as to thickness by a gauging and stripping instrumentality generally designated 36 (see Figs. 6 and 8), whereby its variable vertical thickness at spaced points in the direction of travel thereof, arising from the multi-ply thickness of the carton stock at said points, is taken into account in preventing more than a single carton to issue from the hopper. Passing the gauging and stripping means 36, the blank enters between the bight of the roller forwarding means, generally designated 37 in Fig. 5, comprising a pair of laterally spaced upper friction rolls 38 and a lower platen roll 39 coacting therewith in frictionally gripping and forwarding the carton. At this time the carton is appropriately printed in a manner to be hereinafter described in greater detail.

As the leading edge of the carton issues from the roller forwarding means 37, it passes between a pair of spring stripper and control fingers 40 which serve to maintain frictional control on the carton after it has passed from the bight of said roller means. At this time the leading edge of the collapsed carton is engaged by a pair of V-shaped, traveling abutment members 42 which are adapted to erect the body of the carton. Members 42 are spaced laterally relative to one another, being carried on a yoke 43 for movement in counterclockwise direction into engagement with the carton. Simultaneously, the curved carton spreader arm 26 travels downwardly from the upraised position thereof illustrated in Fig. 3, passing through the aperture 13 in the carton to engage the wall area 16 therebeneath and thrust the wall 10 downwardly against the lower arm of the V-shaped member or element 42. In the meantime, continuing movement of the last named member has brought the upper arm of the same into engagement with the corresponding wall of the carton, as illustrated at C in Fig. 14. Immediately following this, a carton set-up head, generally designated 44 and carried on an oscillatory arm support 45, is caused to travel in clockwise direction to engage the opposite, cross partition members of the carton, the latter stages of the clockwise movement of head 44 being accompanied by a pivotal movement of certain partition erecting leaves thereon to swing the cross partitions 20 of the carton into erected upright position. Movements of the partition set-up head 44 and V-shaped erecting member 42 are synchronized so that the former engages the carton in properly timed relation at the end of the counterclockwise stroke of the latter. Continued clockwise movement of the partition set-up head 44 carries the bottom forming wall of the carton against a plate-like erecting blade 46, whereby said bottom wall elements are shifted towards the cross partitions of the carton and latched relative to the hooks thereof. In this condition the erection of the carton is completed and it is discharged under engagement by a T-shaped discharge foot 47, actuated in timed relation to the carton set-up head 44, down the inclined slide 48.

Figure 2:
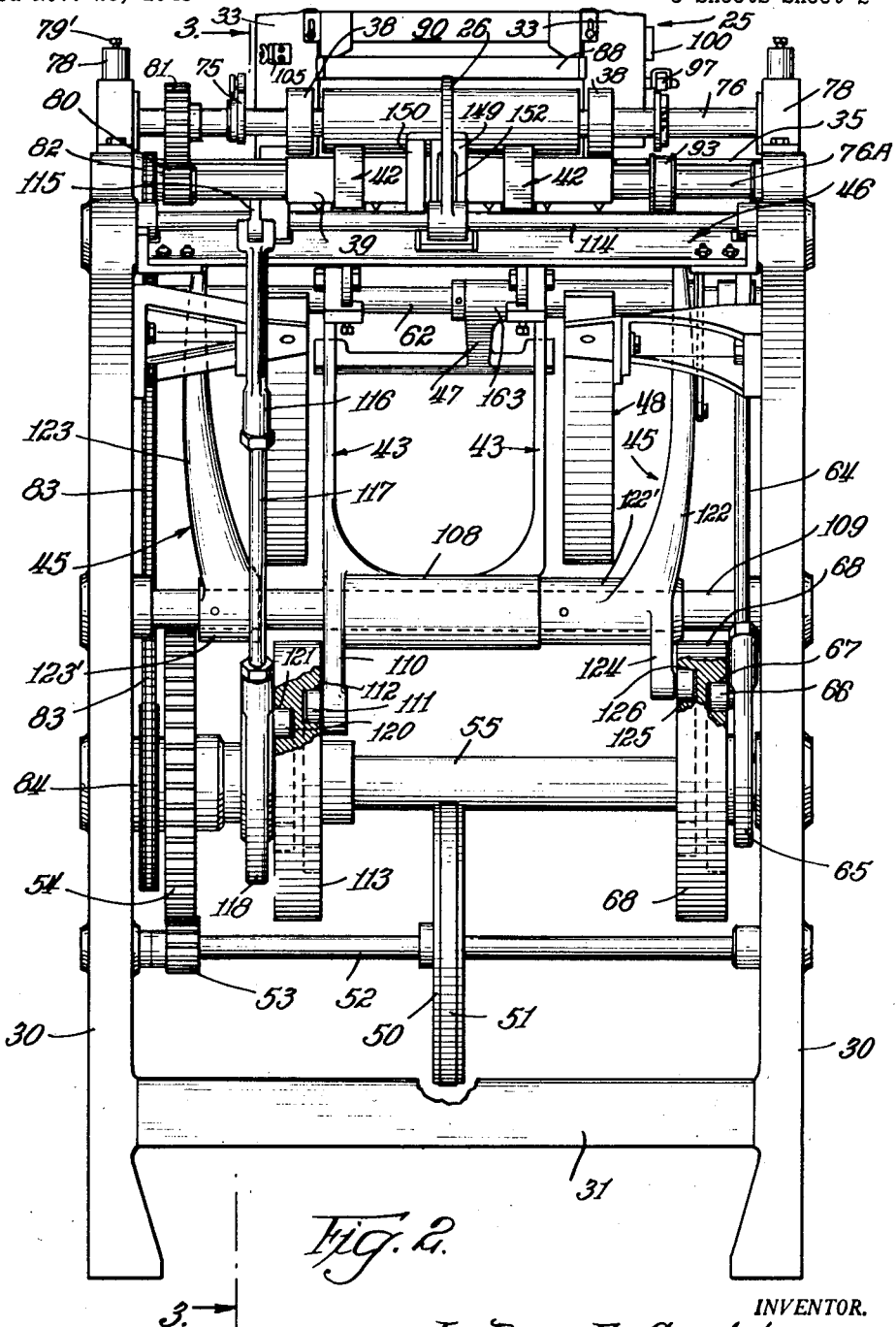
Fig. 2 is a front elevation of the apparatus of Fig. 1, part of the carton containing magazine or hopper being broken away.
Figure 3:
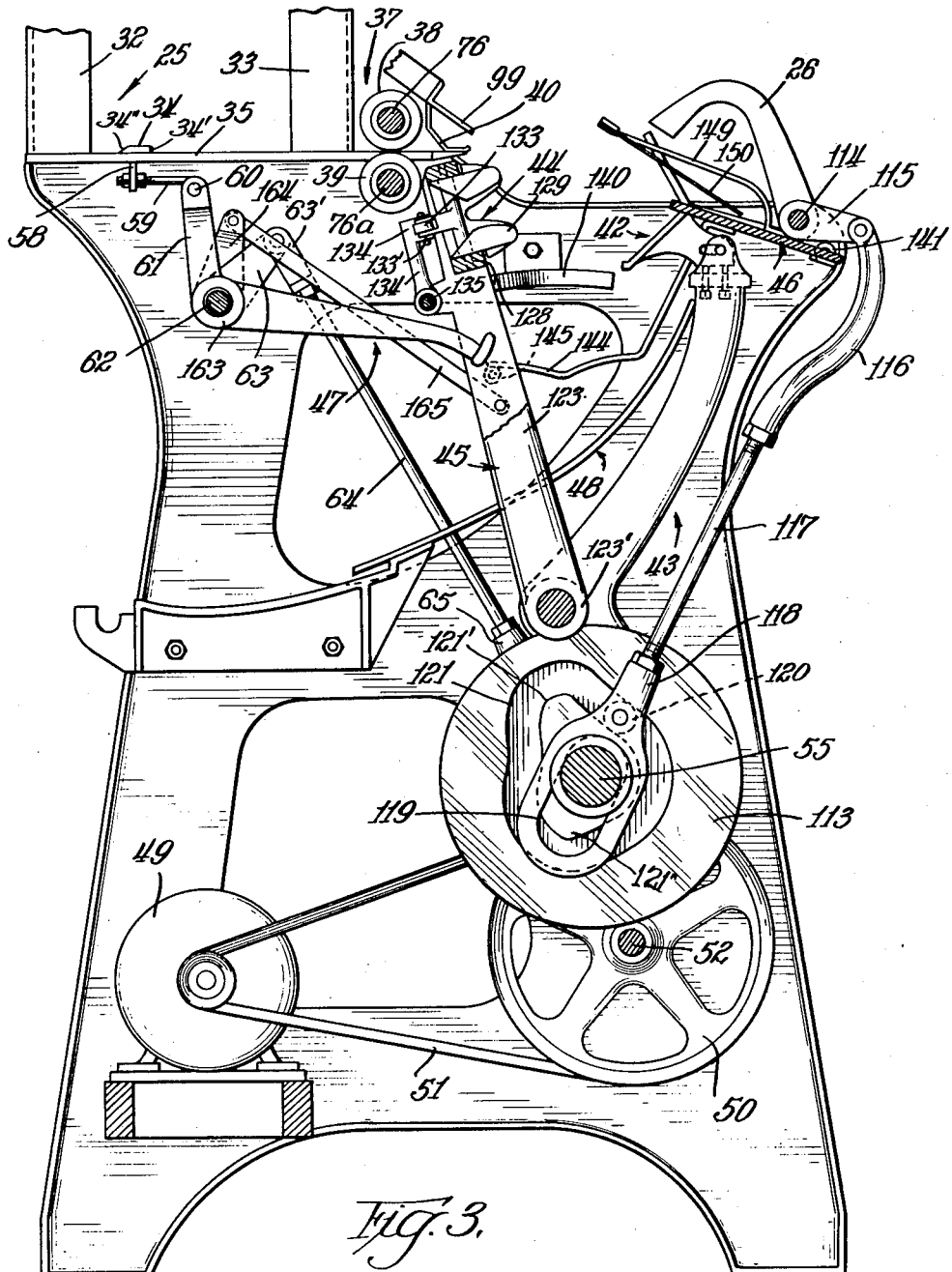
Fig. 3 is a vertical cross sectional view taken substantially along the line 3—3 of Fig. 2.

Considering the structural features in greater detail, the various operating instrumentalities of the apparatus are driven from an electric motor 49 which is appropriately mounted on a platform between the frame members 30 and which actuates a drive sprocket 50 by means of a connecting belt 51 (see Figs. 2 and 3). Sprocket 50 is secured on a transverse drive shaft 52 appropriately journaled at its opposite ends in the frame members 30, said shaft carrying a drive pinion 53, which meshes with a large gear 54 on a transverse main drive shaft 55 paralleling shaft 52 in vertically spaced relation thereto. The shaft 55 is supported on bearings in frame members 30 and has mounted thereon various operating and timing devices which are described in specific detail in connection with the various instrumentalities operated or timed thereby.

Figure 6:
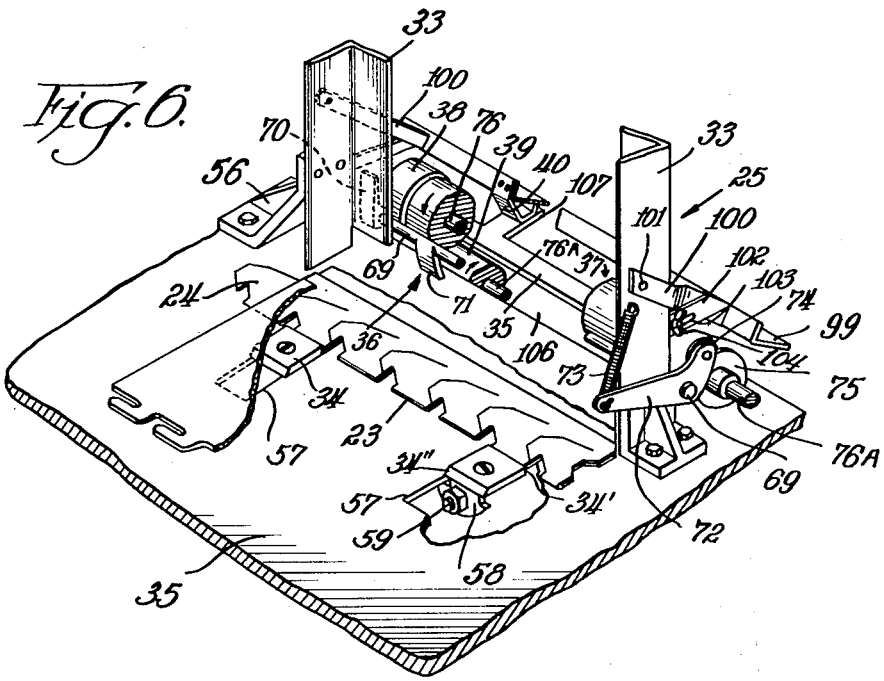
Fig. 6 is a fragmentary perspective view showing the hopper of the machine and certain feeding, control, printing and like operating parts which cooperate therewith.

As stated above, a stack of cartons is initially placed in the hopper 25, resting on the floor 35 of the hopper in the fashion illustrated in Fig. 6, i. e., with terminal cross partition specifically designated 24 projecting laterally therefrom adjacent the leading edge thereof. It will be noted that the hopper member 33 adjacent said laterally extending partition 24 is elevated somewhat above the hopper bottom to permit passage of the partition therebeneath, said upright being for this purpose mounted on a laterally offset bracket 56. The other of the two forward uprights 33 is secured to the hopper floor 35 by a conventional bracket, but has its inwardly extending flange cut away adjacent the bottom to allow passage of the cartons. In being placed in the hopper 25, the stack of cartons is laterally confined sufficiently to retain the same in upright condition (see Fig. 1), without impeding the advance of the lowermost by pusher lugs.

Figure 4:
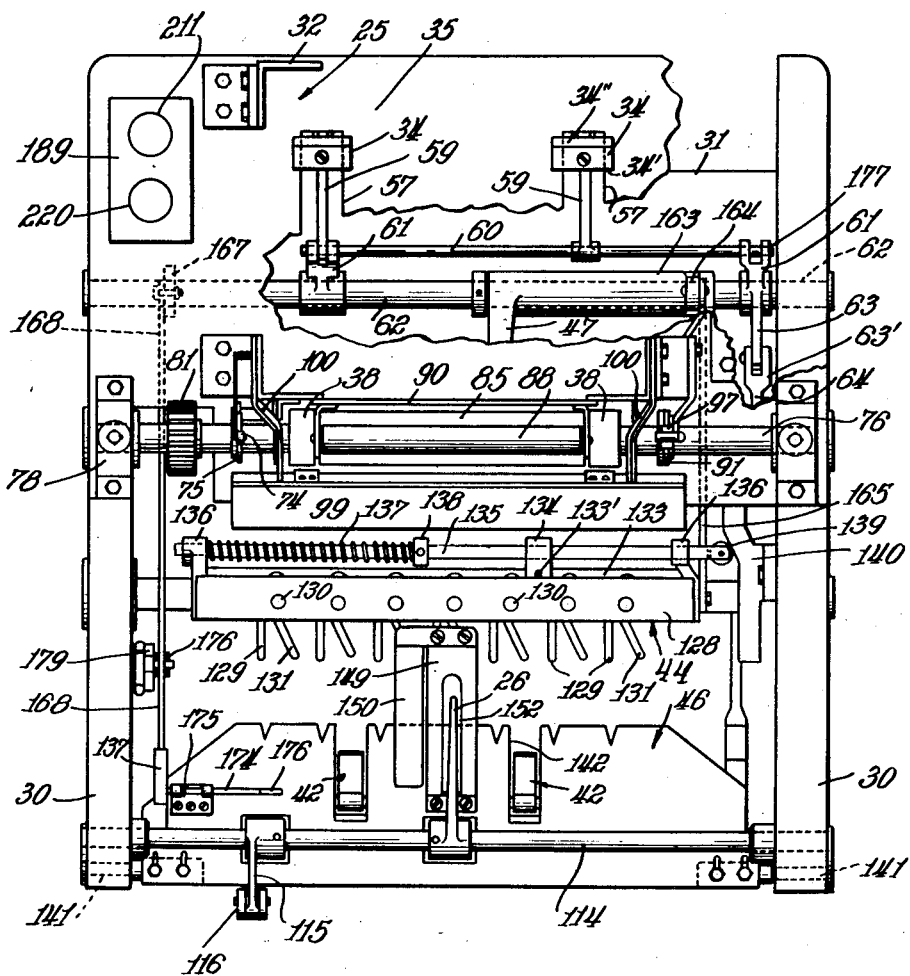
Fig. 4 is a plan view of the machine, broken away in part to better show portions of the operating mechanism.

Referring to Figs. 3, 4 and 6, said pusher lugs operate in parallel, longitudinally extending slots 57 in hopper floor 35, which accommodate the depending actuating elements 58 for the lugs. The lugs 34 are sufficiently large to laterally overhang the margins of the slots and slide on the top surface of the plate 35. As illustrated in Fig. 6, said lugs are intended to engage the rear fold line 23 of the partition elements 20 of the carton, which are stacked with the folded partitions 20 disposed downwardly. They accordingly are provided with abrupt forward noses 34' and rearwardly inclined tail portions 34", to the end that a positive engagement on said fold line will take place on the forward advancing stroke, the lugs on the rearward or retracting travel thereof sliding freely beneath the next carton thereabove. Reciprocatory actuation of the lugs is accomplished by the adjustable pull rods 59, see Figs. 3 and 4, which are threaded for adjustable securement by nuts and lock nuts to the depending lug actuating elements 58 and which at their forward extremities are pivoted on a cross rod 60. Rod 60 is carried by spaced arms 61 which are secured on an oscillatory cross shaft 62 journaled in opposed frame members 30. Of the two arms 61, that appearing at the right in Fig. 4 is a component of a bell crank whose other arm 63 serves as an actuator for the shaft and arms 61, being clevis-connected by member 63' to an elongated, downwardly and forwardly extending adjustable thrust rod 64 which at its lower end (see Figs. 2 and 3) has secured thereon a slotted yoke 65. Rod 64 is reversely threaded at its connections to member 63' and yoke 65 for facilitated adjustment, as will be described.

Yoke 65 receives the main drive shaft 55 and slides transversely relative thereto as rod 64 is actuated reciprocably in the direction of its length to thereby rock shaft 62 and reciprocate lugs 34. Reciprocation is imparted to the rod by a cam follower roller 66 rotatably carried by member 65, as illustrated in Fig. 2, which travels in one double-faced cam track 67 of a rotary cam 68 secured to drive shaft 55. Accordingly, upon rotation of shaft 55 through the agencies described above, the rod will be actuated to rock shaft 62 and arms 61 thereon, thereby causing lugs 34 to reciprocate forwardly and feed the lowermost carton from the hopper towards the feeding means 37. It will be appreciated that the shape of the cam track 67 in cam 68 is such as to impart a desired uniform forward and return stroke to said lugs, in timed relation to the various other operating instrumentalities generally referred to above.

Oscillatory shaft 62 serves as a drive source for certain alternatively available, automatic, interrupting mechanisms for throwing the machine out of operation in the event cartons are not properly set up thereby. However, since such mechanism does not come into play in the normal course of operation of the apparatus, the description thereof is deferred for the present.

As the cartons pass forward into the bight of friction rolls 38, 39 of forwarding means 37, they are subjected to gauging action by the oscillatory gauging and stripping device 36 referred to above, whereby insurance is had that but a single carton is forwarded at a time.

It is to be noted that at the edge of the carton first fed out of the hopper there are but two thicknesses of material, namely, the bottom forming panels 8, 10; that at that central portion of the carton wherein the glue strip and folded transverse partition are located there are three thicknesses of material, namely, the glue strip 22 and portions of the rear and front side walls 6, 18, respectively, or the folded transverse partitions 20 and the upper part of the rear side wall 6 and the cover 4; and that the trailing cover 4 itself presents but a single thickness of material.

Referring to Figs. 6 and 8 in particular, the device 36 includes a transverse rocker rod 69 oscillatably borne by bracket members 70 adjacent its ends on the forward hopper uprights 33, and provided between said uprights with fixed depending gauge fingers 71, which are adapted to be variably positioned above the hopper floor 35 in accordance with oscillation of the rocker rod 69. To this end, the latter has a bell crank 72 secured to one end thereof which is normally urged in clockwise direction, as viewed in Fig. 8, by a coil tension spring 73 extending between one arm of said bell crank and a hopper upright. The opposite end of bell crank 72 is provided with a cam follower roller 74 which travels on the peripheral, conformed surface of a rotary cam 75. Cam 75 is secured on a transverse, rotatively driven shaft 76 specially journaled in the frame members 30, to which shaft further reference will be made immediately.

The outline of cam 75 is such that, in timed relation to the advance of the carton between the bight of feed rollers 38, 39, the gauge fingers 71 are variably oscillated forwardly only sufficiently to clear the same above the hopper floor 35 enough to permit passage of the aforesaid forward central and trailing sections of the variable thickness carton, in a manner which will be understood. Cam 75 is appropriately timed relative to pusher lugs 34 whereby the feed of more than a single carton at a time is positively prevented, yet the lowermost carton proceeds without impedance.

Figure 5:
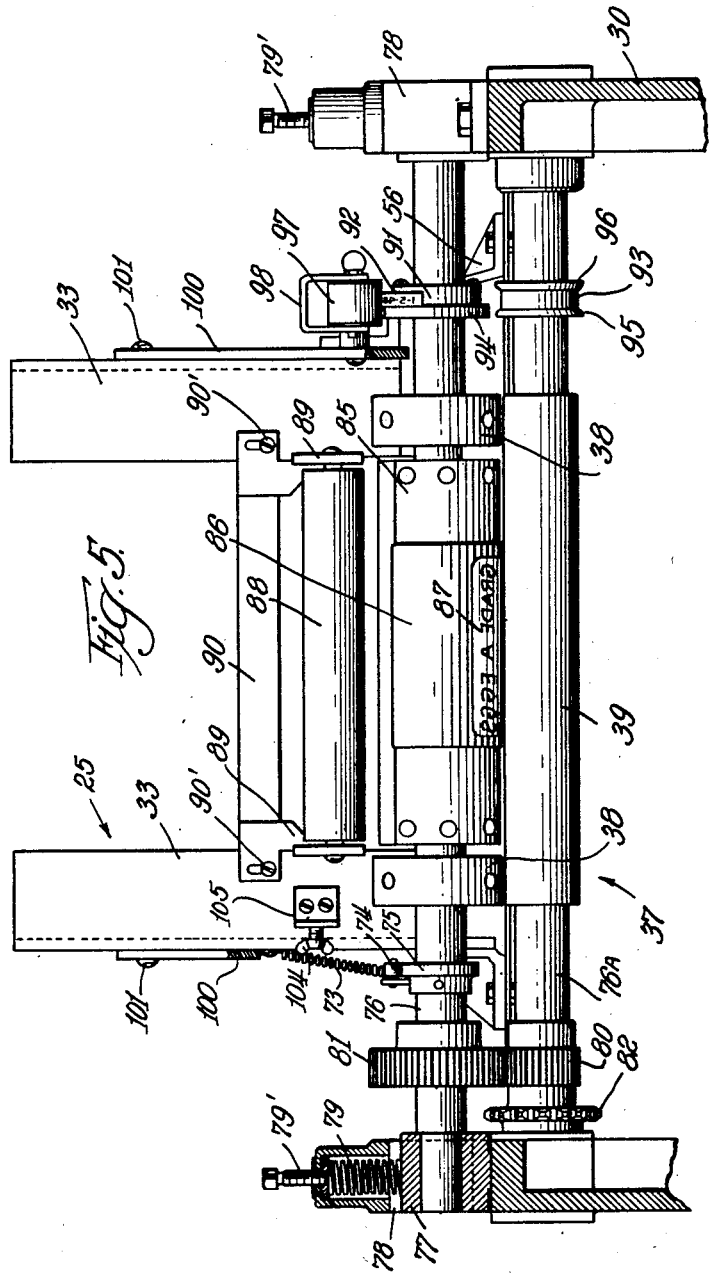
Fig. 5 is a fragmentary detail in front elevation, illustrating the carton feed-out rollers and certain printing and control parts associated therewith.

The shaft 76 referred to above, on which cam 75 and carton feed rollers 38 are mounted, is journaled at its opposite ends on floating journal blocks 77, which are disposed in vertically slotted guides 78 bolted to the top of frame members 30, as illustrated in Fig. 5. Coil springs 79 compressively associated with said guides and blocks serve to urge the shaft and parts carried thereby downwardly in a well known manner, thereby enabling the upper pair of frictional feed rollers 38, as well as certain hereinafter described instrumentalities on shaft 76, to rise and fall, exerting constant frictional engagement on the carton, as portions of the carton of varying thickness pass between the same and the lower supporting and platen roller 39. The compression of springs 79 is adjustable by means of bolts 79' threaded in the guides 78 and axially abutting the springs through an intervening cap disk.

The last named platen roller 39 secured on a shaft 76-A paralleling shaft 76 which is fixedly journaled at its ends in the frame members is provided with a pinion 80 meshing with a gear 81 on shaft 76 to drive the latter. Shaft 76-A derives its drive from a sprocket 82 secured adjacent one end thereof, over which a drive chain 83 is trained, see Fig. 2, said chain being likewise passed around a sprocket 84 secured to the main drive shaft 55. Therefore, it will be appreciated that the feed rollers 38, 39 are driven positively for a positive and controlled forwarding of the carton which is fed thereto by lugs 34. The teeth of pinion 80 and gear 81 are sufficiently long to maintain driving engagement notwithstanding the lift of shaft 76 in operation.

Again referring to Fig. 5, shaft 76 has mounted thereon a cylindrical printing roller 85 to which a metal printing plate or other printing surface 86 bearing an appropriate legend 87 is secured in a well known manner, thus enabling the imprinting of appropriate grade information, advertising or other matter to the cartons as they issue from the hopper and gauge means 36. Plate 86 is inked by any appropriate means, illustrated in the present instance as an impregnated felt or like inking roller 88 positioned thereabove. Said inking roller is rotatably mounted in forwardly projecting arms 89 on a transverse supporting bracket 90, said bracket being carried at its ends for desired vertical adjustment on the hopper uprights 33 by means of clamp screws 90' disposed in vertical slots in the bracket. Hence, the contact of inking roller 88 with the printing surface is readily adjusted.

Reference has been made to the fact, as illustrated in Fig. 6, that a terminal cross partition 24 of the carton projects laterally from one side thereof as the carton is forwarded from the hopper. It is frequently desirable to print certain identifying indicia such as a date or code number therefor on this portion of the carton. Hence, I have provided for that purpose a separate rotary printing element, designated 91, which is secured on the driven shaft 76, said member having a special relief die or like printing element 92 engageable with the partition 24 as the latter passes therebeneath. A special platen roller 93 is provided on the lower shaft 76-A for coaction with the printing element 91, as shown in Fig. 5.

It is desirable that the partition 24 be not unduly rigidly supported for engagement by the die 92, which is ordinarily cast in a relatively soft metal, such as lead, in order that excessive wear and abrasion of the die be avoided. Hence, I have provided a peripheral annular flange 94 on the printing member 91 which is of slightly less radius than the printing indicia on die 92; and immediately therebeneath the special platen 93 is provided with a rounded, annular shoulder 95 coacting with the annular flange 94 in frictionally engaging the partition 24. Platen 93 is relieved, i. e., reduced in diameter immediately beneath die 92, but carries a further rounded annular shoulder 96 spaced from shoulder 95 to support the partition 24 as the die acts thereon. Accordingly, it is seen that a flexible, yieldable support for said partition is afforded while it is printed by the special, relatively soft die 92, thereby preventing abrasion of the latter and insuring equally clear and effective printing during a full day's operation at high capacity output.

Die 92 is inked by an absorbent inking roller 97 which, as illustrated in Fig. 5, is journaled in a U-shaped bracket 98 attached to one of the hopper uprights 33, said roller rotatively engaging the die 92 in entirely conventional fashion.

Leaving the rotary feeding and printing instrumentalities just described, the advancing carton next passes beneath the spring stripper fingers 40. These are carried on a laterally extending stripper plate 99 of angled cross section located above and forwardly of feed means 37. Said plate is secured to pivot arms 100 which are pivoted at 101 to opposed faces of the hopper uprights 33, whereby the plate and fingers 40 thereon are adjustable vertically in accordance with the vertical positioning of said arms. In order to secure the plate 99 in adjusted position, I provide the additional strap-like braces 102 secured to arms 100 or to the plate, which arms 102 are provided with elongated parallel slots 103 adapted to receive a wing nut 104 for adjustably securing said arms to the respective angled ears 105 on the hopper uprights 33.

Referring to Fig. 6, it will be noted that the floor 35 of the hopper is extended in a sufficient area to extend forwardly of the feed rolls 38, 39, being provided with an elongated transverse slot 106 of substantial size through which said rollers make frictional engagement with the cartons being advanced. Forwardly of slot 106, the plate is provided with a pair of laterally spaced, forwardly projecting tongues 107, which are engaged by spring stripper elements 40 on the stripper plate 100. These elements are of resilient leaf spring material, being secured to the angled upturned flange of plate 100, and they coact with the projecting tongues 107 in maintaining fixed frictional control on the trailing edge of the carton after the same has progressed out of the bight of the feed rolls 38, 39, in a manner which will become apparent. At the same time, plate 100 may be readily lifted for access to the printing devices 85, 91 which are normally shielded thereby.

The various positions of the carton as it is operated on by the instrumentalities to be hereinafter described are illustrated successively in Figs. 14-A through 14-F. As the carton issues from between rollers 38, 39, and is brought under the frictional control of the spring elements 40 and coacting fixed tongues 107, the parts occupy the positions diagrammatically shown in Fig. 14-A. As the carton continues to travel, the leading edge, i. e., fold line 9, thereof is met and engaged by the V-shaped body erecting members 42, which are then traveling in an opposite direction (or counterclockwise) with the actuating yoke arms 43 on which they are carried. As illustrated in Figs. 1 and 2, said arms 43 are integrally connected with a hub 108, which is freely pivoted on a shaft 109 paralleling main drive shaft 55 and appropriately journaled at its opposite ends in the frame mmebers 30. Hub 108 carries an integral, radially extending actuating arm 110 on the end of which is mounted a cam follower roller 111 disposed to travel in a double faced cam track 112 of a rotary cam 113.

Cam 113 is generally similar to the above described cam 68 and, like cam 68, is secured to the main drive shaft 55. Hence, yoke 43 is oscillated on a counterclockwise stroke in timed relation to the advance of the carton for engagement with the V-shaped body erecting members 42, as illustrated in Fig. 14-B, the carton having been guided to a position for proper engagement by means of the leaf spring guide 150, to be hereinafter described in detail. It will be understood that the trailing edge of the carton is spring held by elements 40 at this time.

Concurrently with the engagement of members 42 with the carton, the curved body spreader arm 26 swings counterclockwise through the opening 13 in the carton to engage the wall area 16 of the carton therebeneath, as illustrated in Fig. 14-B. This positively initiates the distention of the carton body without the imposition of excessive force on the leading edge 9 by members 42, although at the time of initial engagement of the leading carton edge with members 42 the latter have almost concluded their stroke to the left.

As shown in Figs. 1 to 4 inclusive and 7, the curved spreader arm 26 is secured on a transverse shaft 114 oscillatably borne at its ends in the machine frame members, which shaft has secured thereto a rocker arm 115, which is pivoted in turn to the end of a curved actuator member 116. Said actuator member is adjustably connected by means of a reversely threaded, adjustable thrust rod 117 to a yoke 118, in a manner which is entirely similar to the connection of rod 64 to the yoke 65. In this connection, the reverse threading of the aforesaid thrust rods 65, 117 enables adjustment or timing of the parts, by reason of the turnbuckle action characterizing the same.

Yoke 118 has an elongated slot 119 therein which slidably receives the main drive shaft 55, and a cam follower roller 120 is rotatively carried on the yoke to travel in a double faced cam track 121 in cam 113, the shape of which track is clearly illustrated in Fig. 3. Hence, upon rotation of shaft 55, the curved spreader member 26 is given an oppropriate downward stroke to initially distend the body of the carton from the position of Fig. 14-A through the position of Fig. 14-B, to the position of Fig. 14-C, after which said spreader retracts to the position of Fig. 14-D. The shape of cam track 121 should be noted. It includes, two lobes or rises 121' and 121" of respectively greater and lesser extent and abruptness for the purposes to be explained.

At about the time the trailing portion of the carton, i.e., locking strip 2, has been released by carton feed-out rollers 38, 39 and while the carton is still gripped between springs 40 and tongues 107, the carton comes in contact along its forward fold line 9 with the lower surface of the spring steel guide 150 (see Fig. 7) which serves to direct the carton into the apices of the pair of arcuately reciprocating spaved V-shaped body erecting member 42, one of which is particularly shown in Fig. 10. At the phase illustrated in Fig. 14-B the V-shaped members 42 have almost reached the limit of their counterclockwise swing in the direction of the machine hopper 25.

Also at about this time the free edge of the hinged longitudinal partition inserting blade 46 moves in a manner hereinafter described to serve temporarily as an abutting surface against which the carton bottom panel 10 may find support against displacement during the downward stroke of the carton body spreader member 26 described above, which initiates and completes distention of the carton body. This takes place when cam follower roller 120 rides onto the minor rise 121'' of the track 121 in cam 113, as illustrated in Fig. 3. As the V-shaped members continue to move in the direction of the hopper, i.e., to the left, the carton body is distended into generally hexagonal sectional shape (see Fig. 14-C), and adjacent the point of maximum leftward stroke of the V members they withdraw from the longitudinal partition inserting blade 46, which no longer serves as an abutment for the carton, it now being vertically supported adjacent its fold line 17 by the outwardly extending integral shoulders 42' of the V-shaped member 42. During this interval member 26 achieves its maximum carton distending stroke.

The V-shaped members then begin to withdraw to the right, i. e., in a direction away from the hopper 25, and member 26 also begins to withdraw upwardly, coincident with which transverse partition erecting head 44, which had previously started its forward clockwise operative stroke, begins to contact the as yet untouched carton transverse partitions 20, as in Fig. 14-C. The construction and operation of head 44 will now be described.

Head 44, as illustrated in Figs. 1, 2 and 3, is carried by a pair of laterally spaced arms 122, 123, the respective integral hubs 122', 123' of which are pinned on the above mentioned transverse rotatable shaft 109. Hub 122' is provided with an integral radial actuating arm 124 carrying a rotary cam follower 125 which travels in the double-faced cam track 126 of the rotary cam 68. Accordingly, simultaneous oscillatory movements of arms 122, 123 with shaft 109 is produced, causing the head 44 to advance for clockwise carton engagement in the manner described.

Figure 7:
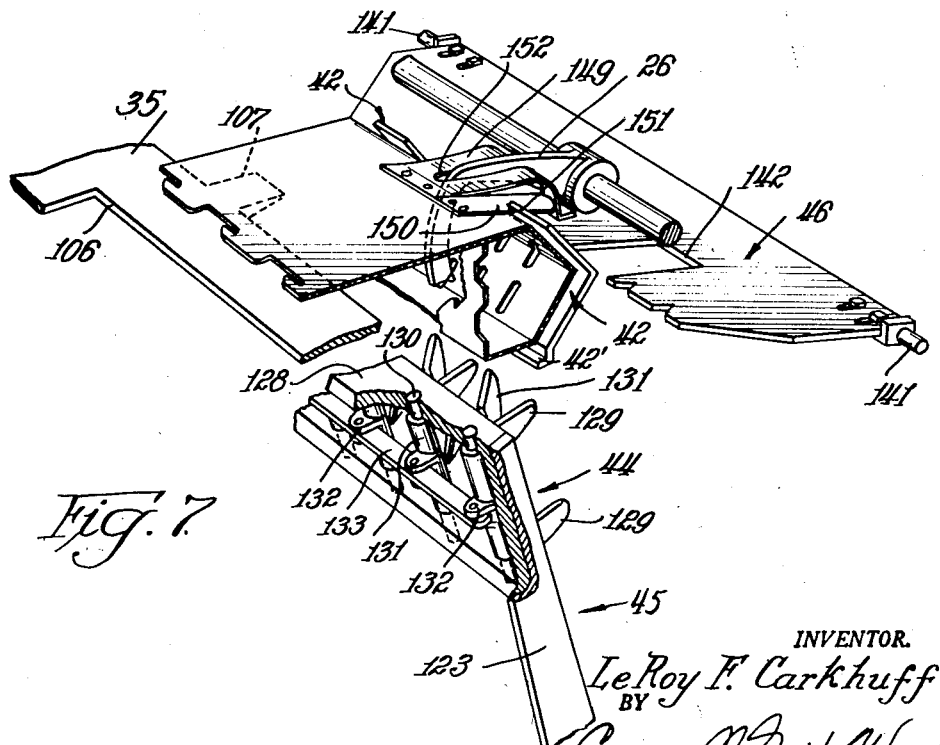
Fig. 7 is a fragmentary perspective view illustrating the relation of a transverse partition set-up head, a carton guide, a longitudinal partition set-up blade and a carton body spreading member of the machine in one position during the operation of the machine.

Referring to Figs. 3, 4 and 7, the partition set-up head 44 is carried on an open rectangular frame 128 on the free end of arms 122, 123 and is provided with a plurality of pairs of fixed abutments 129, spaced longitudinally on said frame and projecting forwardly therefrom. A plurality of rotatable spindles 130 extend transversely of and are journaled at their opposite ends in the side members of said frame, being in spaced parallel relation along the length of the latter. Spindles 130 carry bifurcated radially projecting leaves 131 spaced from one another similarly to the spacing of the abutments 129 and positioned in alignment with and adjacent said respective abutments. In addition, each leaf carries a radially projecting forked lug 132 which lugs pivotally articulate the respective leaves with a longitudinally extending actuating link 133. As illustrated in Fig. 4, the link 133 is pin and slot connected at 133' to a yoke 134 which is affixed at its lower end to a reciprocable actuating rod 135 paralleling link 133, said rod being guided in spaced ears 136 on the head frame 128. Rod 135 is normally urged toward the right by means of a coil spring 137 encircling the same between one of the ears 136 and a collar 138 adjustably secured to the rod. At its free end rod 135 carries a cam follower roller 139 which rides the surface of a fixed, appropriately contoured plate cam 140 secured on one of the frame members 30 of the apparatus. Hence, while the follower roller 139 rides onto the rise of cam 140, the pivoted leaves 131 of the carton set-up head 44 remain in the open position of Fig. 4, but when the roller rides onto the low portion in its operative stroke of cam 140, the leaves will be spring actuated in unison toward the respective abutments 129. Cam 140 is a fixed surface cam secured to one of the frame members 30.

Assuming that the parts have reached the position of Fig. 14-C, the partition set-up head 44 traveling to the right and the body spreader member 26 having reached the limit of its downward, body distending stroke, the leaves 131 of the head are open, in the position of Figs. 4 and 7. As the head advances, the abutments 129 engage the cross partitions 20 of the carton to initiate bending thereof out of coplanar relation, and by the time the carton set-up head 44 is fully engaged with the cross partitions of the carton, as shown in Fig. 14-D, leaves 131 will have been spring urged their full closing stroke relative to the abutments 129 of the head to clamp the cross partitions therebetween and position the same in upstanding set-up relation between the opposite side walls 6, 18 of the carton. Head 44 also causes the carton body to be shaped to the trapezoidal outline of Fig. 14-D. Concurrently with this, the spreader member 26 has traveled upwardly on its retractile stroke to the position of Fig. 14-D. Next, the stroke of the V-shaped erecting members 42 reverses and they recede away from the machine hopper, the carton being held on the partition set-up head 44 by the clamping action of the leaves 131 on abutments 129.

This recessive travel of the members 42 results in exposure of blade 46 and the engagement of the now coplanar bottom wall portions 8, 10 of the carton with said bottom partition erecting blade 46 along fold line 9 separating said portions. The trailing cover edge of the carton remains engaged between springs 40 and tongues 107, as shown in Fig. 14-D, until the head 44 withdraws it, as will be described. The rest of the erecting operation is performed by blade 46 on the carton as supported on head 44.

Erecting blade 46 is mounted on the frame members 30 by means of trunnions 141 at the opposite ends thereof, and, as illustrated in Figs. 1, 4 and 7, the blade is provided with parallel elongated slots 142 opening to the edge thereof to accommodate the V-shaped, body erecting members 42 in their stroke. The operating edge of blade 46 is notched at 142' to accommodate the cross partitions 20 previously erected by head 44, which enables full insertion of the blade relative to the carton body. As stated, such relative movement of members 42 and blade 46 causes the blade to engage and inwardly deflect the carton bottom, in the manner clearly illustrated in Figs. 14-D and 14-E, causing the bottom panels 8, 10 to be thrust to inverted V outline and to lockingly engage with the hooks 21 on the cross partitions 20. During this operation the feed of the carton on head 44 frees its trailing edge from springs 40 and tongues 107, and its freed edge snaps upwardly above stripper plate 100, see Fig. 14–E.

Transverse partion set-up head 44 now begins to withdraw in the direction toward the hopper, but the fixed abutments 129 and movable leaves 131 thereof still maintain engagement with the transverse partitions which are now firmly interlocked with the carton bottom. The head 44 thus carries with it the now set-up carton. The rear portion 2 of the carton is therefore brought into contact with upwardly extending flange of stripper plate 100 (see Fig. 14–F) and at about the time this contact is made the leaves 131 are swung to open position, thus releasing their grip on the carton. The abutment of the rear portion of the carton cover against stripper plate 100 tends to displace the carton from the head 44 and, as shown in Fig. 14–F, the head 44 then continues its movement to the left, whereupon the carton is freed therefrom. As soon as the carton is freed from the head, member 26 describes a second downward arcuate stroke as its actuating cam follower 120 rides onto the major rise 121' of cam 121, which stroke is accordingly of greater speed than that by which it distended the carton body. In this instance said member 46 contacts the carton along its rear wall, displacing it completely from any mechanism which had previously operated on it, whereupon the carton is impelled by member 26 and by gravity onto the carton discharge slide 48 described above, to be immediately thereafter acted on by the discharge foot 47.

Provision is made for imparting a slight oscillatory movement to the bottom erecting blade 46 as it comes into engagement with the bottom of the carton. To this end, said member is constructed in the manner illustrated in Fig. 9. Referring to that figure, it will be observed that the same is provided with a clamping plate 143 coacting with the member 46 in clamping a downwardly and rearwardly extending plate-like actuating cam 144 thereto. Said cam projects rearwardly for camming engagement by a roller 145 on the oscillatory arm 123 which carries the partition set-up head 44. Therefore, upon relative movement of the parts, a slight pivotal movement through a limited arc will be imparted to the blade 46 to insure it proper engagement at the proper time with the advancing fold line 9 of the carton in timed relation to its advance and manipulation by the above described instrumentalities.

Provision is made for vertical adjustment of the bottom erecting blade 46 relative to its actuating cam 144, in the form of a pair of machine screws 146 passing through the clamping plate 143 and a coacting offset portion 147 of cam 144, and threaded into the blade 46. These screws are located on either side of a fulcrum pin 148. Accordingly, by backing off and adjusting screws 146, a limited pivotal adjustment of the cam relative to the blade may be had by pivotally biasing the same relative to the pin 148, the screws 146 being taken up to lock the blade in adjusted position.

In order to support the guide spring 150 referred to above, which insures the proper location of the forward fold line 9 of the advancing carton with reference to the V-shaped erecting members 42, the bottom set-up blade 46 carries a spring element 149 which extends rearwardly toward and over the advancing carton, said element having the forwardly and downwardly angled guide 150 formed integrally thereon. Guide 150 is receivable in slot 151 in the V-shaped members 46 upon relative reciprocation of the respective parts. Referring to Fig. 7, it will be noted that the element 149 is also provided with an elongated clearance slot or aperture 152 for the reception of the carton spreader 26 during the oscillatory movement of the latter. Regardless of the angular position of the blade 46, the advancing carton will slidably engage the guide 150 and be directed thereby into the apex of the V-shaped members 42.

Inasmuch as it may be desirable to adjust the forward-rearward position and/or the angularity of the aforesaid V-shaped members 42, the arrangement illustrated in Fig. 10 is provided for this purpose, Fig. 10 being an exploded view of the parts. The actuating yoke 43 upon which the members 42 are supported is provided, adjacent the upper extremity thereof, with an aperture 153 for a purpose to be described, and immediately therebelow the yoke carries an inwardly offset ledge 154, the surface of which is machined. A pair of locking studs 155 are adjustably threaded in the offset 154, as illustrated. The member 42 has an integral lateral extension or boss 156 in which is formed an elongated slot 157 adapted to receive a special adjusting bolt 158. The lower surface of the extension 156 is machined at 159 and is adapted to rest on surface 154 and be engaged by the locking studs 155. Bolt 158, inwardly of the head thereof, is provided with an eccentric adjusting cam portion 160 which, in the operative position of the parts, is disposed in slot 157, and adjacent cam portion 160 has an internally threaded sleeve extension 161. This sleeve extension is concentric with the axis of the bolt and is adapted to be received as a trunnion in the aperture 153 on arm 43. The screw 162 is threadedly receivable internally of the sleeve 161 to secure the parts in assembled relation.

When it is desired to adjust the forward-rearward position of the V-shaped member 42 on its supporting arm, the screw 162 is loosened, whereupon the member 42 may be slidably adjusted relative to the bolt 158 in either the forward or rearward direction. Should it be desired to adjust the angular position of the members 42, the screw 162 and also studs 155 are backed off, whereupon the bolt 158 is turned to cammingly engage the cam 160 thereof with either surface of slot 157, thereby to bias the member 42 in either desired angular direction, after which the screw and studs are again tightened to holding position.

Following the operation of the bottom erecting blade 46 to engage the bottom forming panels 8, 10 of the carton with the erected cross partitions 20 thereof, and upon retraction to the left of head 44, it only remains to discharge the erected or set-up cartons from the machine. This function is formed in part by stripper plate 100 and by the spreader member 26 as its cam follower roller 120 travels onto the rise 121' in cam track 121 as described above. The cartons are dropped on their bottoms onto the discharge slide 48, after which the completely set-up carton, plus the preceding series of set-up cartons which have been discharged in the same way, is forwarded in the discharge direction by the oscillatory T-shaped discharge foot 47 generally described above and illustrated in Figs. 2, 3 and 4. This foot is loosely pivoted on oscillatory shaft 62 by means of an elongated integral hub 163, which hub has a radially extending arm 164 that is pivotally connected by a link 165 to a medial point on one of the actuating arms 123 for the partition set-up head 44. Hence, as the head travels on a new cycle in clockwise direction, as viewed in Fig. 3, for engagement with a carton being forwarded toward the V-shaped members 42, the T-shaped discharge head 47 is simultaneously rocked in clockwise direction to engage the rear of the carton which has just been set up and released from said head. Inasmuch as the last named carton is generally in rear contacting engagement with a series of previously set-up cartons, the entire series is forwarded in the manner illustrated in Fig. 1. The series may be advanced upwardly along a discharge chute 166 supported on the machine in receiving relation to the discharge end of the slide 48, for further egg handling and cartoning operations.

In the foregoing description reference has been made to the fact that the apparatus involves mechanism for automatically interrupting the operation of the same in the event that a carton is not properly handled. In Figs. 11 and 12 there are shown therein alternate forms of such mechanism for automatically stopping the machine in the event that it should for any reason fail to properly set up a carton on any work cycle.

Reference to Figs. 16 and 17 indicates that, in the set-up condition of the Troyk type carton, the ends of the hooks 21 formed at the free end of the transverse partitions 20 extend a substantial distance outwardly of bottom forming panels 8, 10. The automatic machine throw-out mechanism referred to operates on a principle involving this fact. In short, the machine throw-out mechanism is inhibited from functioning during each week cycle of the machine, so long as the hooked ends 21 of the transverse partitions contact an operating lever, as they will invariably do when each carton is properly set up; but when the operating lever fails to make contact, as above described, as it will invariably do when a carton is not properly set up, the automatic machine stopping mechanism causes the electric operating circuit of the machine to be broken, thereby interrupting its operation.

Referring now to Fig. 11, in conjunction with Fig. 4, the reference numeral 167 indicates an arm which is fixedly attached to oscillatory shaft 62. Arm 167 is pivotally connected to an elongated rod 168 which is bent approximately medially of its length to form an upwardly extending arch 169 in which is positioned a pin 170 on a pivoted mercury switch carrying member 171 which is hereinafter described.

Rod 168 extends generally horizontally and longitudinally forwardly of the machine to terminate in a free end adjacent which is a stirrup or yoke 172 within which said rod may have free reciprocatory movement under the urging of oscillatory arm 167. The yoke has a rearwardly extending arm 173 formed integral therewith which is attached to the outer end of a rod 174 which is pivotally supported on the longitudinal partition inserting blade 46, through the agency of hinge plate 175. Rod 174 is of sufficient length to permit an integral control or actuating crank 176 on one end thereof to be contacted by the downwardly extending hooked ends 21 of two adjacent transverse partitions of a carton, when the same is properly set up on head 44. Accordingly, the crank pivots rod 174 to lift yoke 172 each and every time said crank 176 is contacted as above described by the ends of the transverse partitions of a properly set up carton.

The switch carrying arm 171 is mounted on an inner side of one frame member 30 by a pivot bolt 175 and is tipped slightly forwardly in its normal position by a helical spring 177 which has one end clipped into a washer 177' and its other end clipped to arm 171. The pin 170 on arm 171 extends outwardly to position adjacent arch 169 in rod 168 and positioned therebelow is a spring clip 178 in which is mounted a mercury switch 179 which is normally held in tilted circuit closing position under the urging of spring 177. The reference numerals 180, 181 indicate current carrying leads through which a motor energizing circuit is maintained by switch 179 in its normal tilted position.

During operation of the machine the arm 167 and rod 168 are undergoing constant reciprocation, and each time a carton is set up the projecting hook ends 21 of transverse carton partitions 20 contact the control crank 176, forcing it forwardly and coincidentally lifting yoke 172. Each time yoke 172 is lifted it lifts rod 168, thereby preventing pin 170 from being actuated by the end of arched portion 169.

However, in the event that no carton is set up by the machine during its work cycle, there is nothing to contact crank 176, hence, rod 168 is not lifted and operating pin 170 of switch bearing member 171 is contacted by the inner rear surface of arch 169, as a result of which the entire switch carrying arm is pivoted to dotted line position forwardly of the machine. This movement causes the mercury in switch 179 to break the circuit between leads 180, 181, thereby stopping the machine, as will be more fully explained hereinafter.

Referring now to Fig. 12, there is in this instance shown an automatic machine stopping electric circuit breaker making use of a micro-switch rather than the mercury switch used in the form of similar device shown in Fig. 11. In this instance rod 174 also has at its free end the angularly bent transverse partition contacting crank 176 and is medially pivoted on a hinge plate 175 which is attached to carton longitudinal partition inserting blade 46. An elongated finger 182 is rigidly attached to rod 174 opposite its operating crank 176 and is pivotally movable therewith. The free end of finger 182 extends through an elongated slot 183 provided in a flat spring member 184, which is pivoted for vertical swinging movement to the free end of an L-shaped bracket 185 attached to the machine frame member 30.

A normally closed micro-switch 186 is diagrammatically illustrated, being attached to the frame member 30 in horizontal alignment with L-shaped bracket 185. The operating button 187 of micro-switch 186 is open and adapted to be contacted by the medial portion of flat spring member 184 under certain conditions, as hereinafter set forth, said button being positioned to face in the direction of the machine hopper 25. A lug 188 extends from one end of the frame 128 of transverse partition set-up head 44, this lug being of sufficient length to contact flat spring member 184 in the lowered, dotted line position of the latter, as the head advances toward the micro-switch. It cannot, of course, contact such spring in the elevated position thereof.

Whenever during the work cycle of the machine a carton is properly set up, the ends 21 of the carton transverse partitions will contact control crank 176, tilting it in a direction forwardly of the machine and finger 182 will be lifted thereby, carrying with it flat spring 184. The lug 188 on the set-up head 44 will then fail to contact spring 184, and hence the circuit through micro-switch 186 is unbroken and the machine will continue to operate in regular manner.

However, in the event that a carton should fail to be set up during the operating cycle of the machine, crank 176 is not actuated, and spring 184 remains in the downward position shown by dotted lines in Fig. 12. Hence, lug 188 will contact the end of said spring, forcing its medial portion into engagement with operating button 187 of micro-switch 186, thereby breaking the machine's electric operating circuit, in the manner which follows.

The electric circuit for the machine includes a start-stop switch 189 and a relay 190 shown in Fig. 1 and includes the wiring circuit diagrammatically shown in Fig. 13. Below the outwardly extending insulated start button of switch 189 is a normally elevated bus bar 191 which is spring-loaded to return to its normal upward non-contact forming position after the machine has been started. Below bus bar 191 are a pair of spaced contacts 192, 193, which are temporarily bridged by said bus bar when depressed. During operation this machine starting circuit is normally open. Contact 192 is in direct connection with one side of the line of the electric current source. Contact 193 is directly connected to contact 194 of the stop side of start-stop switch 189. A bus bar 195 normally bridges the gap between contact 194 and another contact 196. During action of the machine, this circuit is normally closed. Contact 196 is wired to another contact 197 which is in spaced relation to another contact 198 the gap between which is bridged by a normally closed bus bar 199 which is attached to the thermally responsive element 200 of a thermal unit which has a resistance coil winding 201. Contact 198 is wire-connected to a contact 202 which represents one end of the winding of a relay solenoid coil 203. The other end of the winding of relay solenoid coil 203 terminates in a connection 204 to which is connected the other side of the source of current. A relay solenoid plunger 205 carries the bus bars 206, 207 and 208 which are insulated from one another by insulating strips 209 and 210.

It will thus be seen that pressing the starting button 211 of switch 189, which depresses bus bar 191, will so bridge the gap between contacts 192 and 193, the possible gaps in the line between connections 194, 196 and 197, 198 being bridged by the normally bridging position of the bus bars 195 and 199, that a complete circuit will be made to the opposite side of the electric line through relay solenoid coil 203 to the opposite side of the line of the current source which will energize such coil. This coil normally remains energized at all times during operation of the machine.

Energization of coil 203 will draw forward bus bars 206, 207 and 208 into contact bridging relation. Bus bar 206 then bridges a gap between contacts 204 and 212; bus bar 207 bridges a gap between contacts 213 and 214; and bus bar 208 bridges a gap between contacts 215 and 216. In bridging the gap between contacts 204, 212, bus bar 206 closes the circuit from one side of the electric motor 49 to one side of the power source, and in bridging the gap between contacts 213, 214, bus bar 207 completes the circuit between the other side of the electric motor and the other side of the power source, causing the motor to operate. Interposed in the last mentioned circuit between connection 213 and motor 49 is a resistance coil 201, which under an extreme or dangerous overload exerted on motor 49 tends to heat to a degree causing thermal element 217 to expand to such a degree as to cause bus bar 199 to move to non-bridging relation between contacts 197, 198, breaking the heretofore completed circuit which had energized relay solenoid coil 203 and permitting solenoid plunger 205 to return to a position at which bus bars 206, 207 and 208 fall back into non-bridging relation with respect to their associated contacts, thus stopping the motor and preventing damage thereto.

In bridging the gap between contacts 215, 216, bus bar 208 completes a circuit which passes consecutively through contacts 193, 194, thence across bus bar 195 to contact 196, thence across the gap between contacts 197, 198 through bus bar 199 and thence to contact 202 of relay solenoid 203. Interposed in the circuit between contacts 193 and 216 is a normally closed switch which may be of the mercury or micro-switch type, such as particularly shown, respectively, in Figs. 11 and 12 and indicated therein by reference numerals 179 and 186, respectively, which switch has within it contacts 217, 218 normally bridged by an element 219.

From the foregoing description and as above mentioned it will be seen that during the operation of the machine solenoid coil 203 is constantly energized. It is initially energized by pressing the starting button 211 completing the temporary circuit described above with respect thereto. Once so energized it remains energized under that circuit extending between connections 204 and 215. It may be de-energized, thus stopping the motor, by breaking of the circuit (1) manually as by depressing stop button 220 or (2) automatically as by breakage of the circuit through switch 179 (or 186) by (*a*) failure of a carton to open, as described with respect to the showings of Fig. 11 or 12, or (*b*) by dangerous overheating of the motor or power lines by operation of the resistance coil and its associated parts which will break the circuit across connections 195, 196 as above described.

A relay unitarily embodying the above described relay and associated parts and thermal units and associated parts is that known as the Allen-Bradley switch, Bulletin 815, type B, having a type N thermal unit.

I claim:

1. A carton setting up machine comprising means to feed a collapsed carton edgewise, supporting abutment means engaging the forward fed edge of the carton, means to maintain engagement of the forward edge with the abutment, a dual stroke body distending and discharging element, means operating the said body distending element while said edge is engaged by said abutment means to engage one portion of said carton and initially distend the same, means to complete erection of the carton, said operating means including means to actuate said element for a subsequent engagement with another portion of said erected carton to discharge said carton.

2. A machine in accordance with claim 1 in which said operating means for said distending and discharging element effects distending and discharge strokes of the latter which are of different amplitude.

3. A carton setting up machine comprising means to feed a collapsed carton edgewise, supporting abutment means engaging the forward fed edge of the carton, means to maintain engagement of the forward edge with the abutment, a dual stroke body distending and discharging element, means operating the said body distending element while said edge is engaged by said abutment means to engage one portion of said carton and initially distend the same, a pair of devices sequentially engageable with opposite sides of the distended carton to complete erection of the latter, said operating means for said element including means to actuate the same for a subsequent engagement with another portion of said erected carton to discharge said carton.

4. A carton setting up machine comprising means to feed a collapsed carton edgewise, supporting abutment means engaging the forward fed edge of the carton, means to maintain engagement of the forward edge with the abutment, a dual stroke body distending and discharging element, means operating the said body distending element while said edge is engaged by said abutment means to engage one portion of said carton and initially distend the same, means to complete erection of the carton, said operating means including a rotary cam provided with lobe-like portions of different height and means engaging said cam and operatively connected to said element to actuate the latter, one of said cam portions causing said element to initially distend the carton and the other causing said element to make subsequent engagement with another portion of said erected carton to discharge said latter.

5. A carton setting up machine comprising means to feed a collapsed carton edgewise, supporting abutment means engaging the forward fed edge of the carton, means to maintain engagement of the forward edge with the abutment including means frictionally engaging opposite surfaces of the rearward portion of the carton while said forward edge is engaged by said abutment means, a dual stroke body distending and discharging element, means operating the said body distending element while said forward edge is engaged by said abutment means to engage one portion of said carton and initially distend the same, means to complete erection of the carton, said operating means including means to actuate said element for a subsequent engagement with another portion of said erected carton to discharge said carton.

LE ROY F. CARKHUFF.

REFERENCES CITED

The following references are of record in the file of this patent:

UNITED STATES PATENTS

| Number | Name | Date |
|---|---|---|
| 1,337,266 | Post | Apr. 20, 1920 |
| 1,366,925 | Northrup | Feb. 1, 1921 |
| 1,637,560 | Krapf | Aug. 2, 1927 |
| 1,765,416 | La Bombard et al. | June 24, 1930 |
| 1,887,596 | Katz | Nov. 15, 1935 |
| 2,018,396 | Burger | Oct. 22, 1935 |
| 2,057,082 | Burger | Oct. 13, 1936 |
| 2,072,065 | Brown et al. | Feb. 23, 1937 |
| 2,079,668 | Swift | May 11, 1937 |
| 2,291,264 | Vergobbi | July 28, 1942 |